Feb. 19, 1929.                                         1,702,983
G. A. SHAFFER ET AL
NAPKIN DISPENSING DEVICE
Filed Jan. 24, 1927          2 Sheets-Sheet 1

INVENTORS
Glenn A. Shaffer
Franklin H. Wirtz
BY
Brown & Phelps
ATTORNEYS

Feb. 19, 1929.
G. A. SHAFFER ET AL
1,702,983
NAPKIN DISPENSING DEVICE
Filed Jan. 24, 1927      2 Sheets-Sheet 2
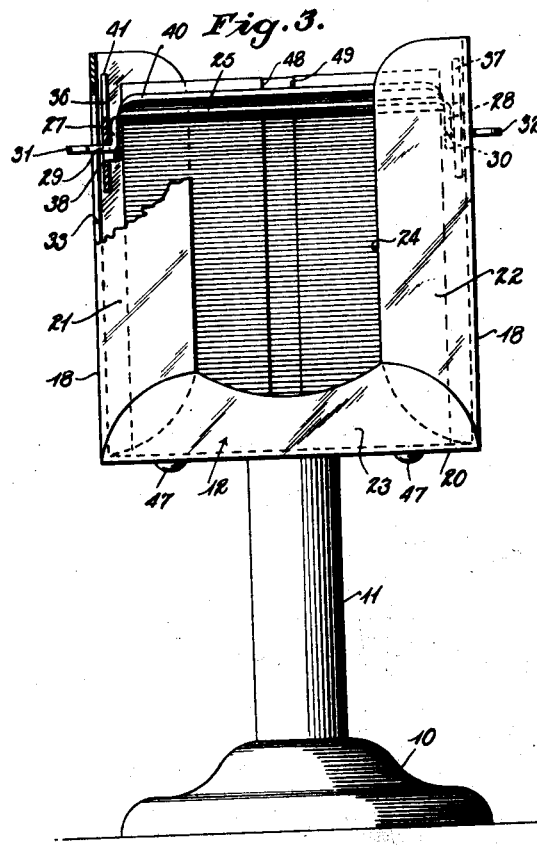
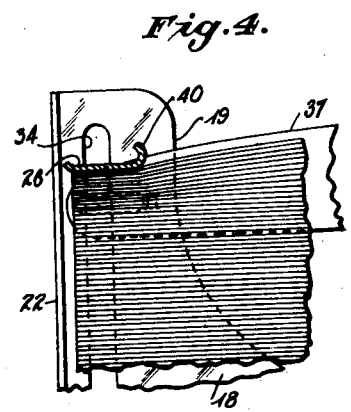
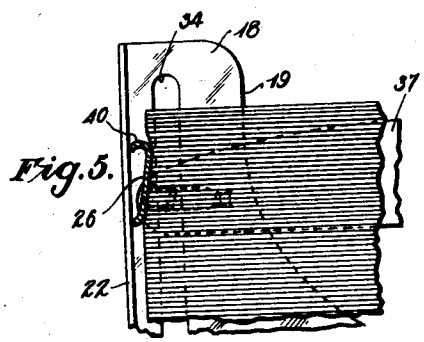
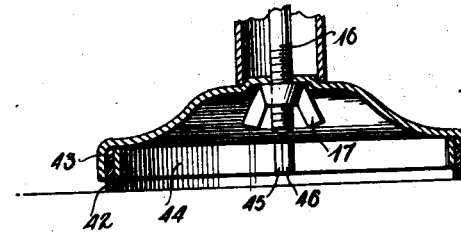
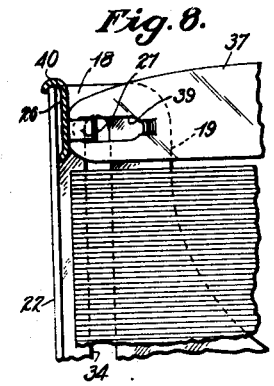
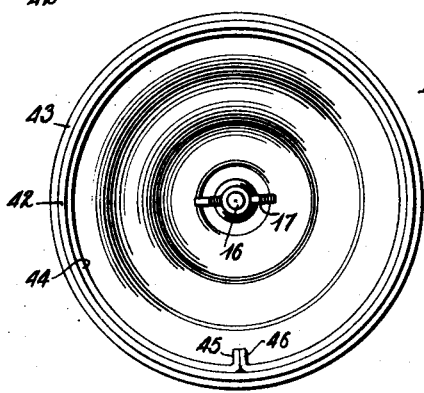
INVENTORS
Glenn A. Shaffer
Franklin H. Wirtz
BY
ATTORNEYS Patented Feb. 19, 1929.

1,702,983

UNITED STATES PATENT OFFICE.

GLENN A. SHAFFER AND FRANKLIN H. WIRTZ, OF GREEN BAY, WISCONSIN, ASSIGNORS TO FORT HOWARD PAPER COMPANY, OF GREEN BAY, WISCONSIN, A CORPORATION OF WISCONSIN.

NAPKIN-DISPENSING DEVICE.

Application filed January 24, 1927. Serial No. 163,272.

The invention relates to napkin dispensing devices and has as an object the provision of a device of this character in which the napkins may be replenished in a simple manner.

It is a further object of the invention to provide means to prevent the removal of a plurality of napkins by the user at one time.

It is a further object of the invention to provide novel means for supporting the sliding bars out of contact with the napkins.

It is a further object of the invention to provide a device of this character having a base which will not scratch furniture.

Further objects of the invention will appear from the following description when read in connection with the accompanying drawings showing an illustrative embodiment of the invention, and wherein:—

Fig. 3 is an end elevation partly broken away;

Fig. 4 is a detail section upon an enlarged scale on line 4—4 of Fig. 2;

Fig. 5 is a like section showing a different position of one of the napkin retaining bars;

Fig. 6 is a detail vertical central section of a modified form of base; and

Fig. 7 is a bottom plan view of the structure of Fig. 6.

Fig. 8 is a detail fragmentary view of the follower and supporting means in supported position.

Figure 1:
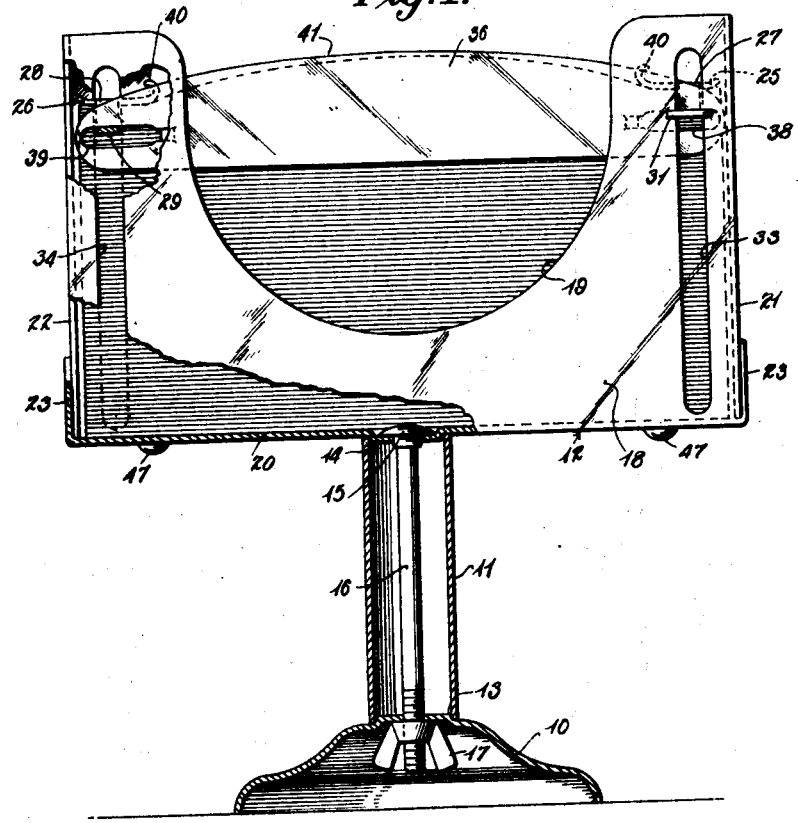
Fig. 1 is a side elevation partly broken away.

As shown the device comprises a base 10, a standard 11 shown as tubular in form and a receptacle 12 supported thereon. To retain the receptacle and standard upon the base, the base is shown as formed with a raised portion 13 about which the tubular standard 11 seats and the receptacle is shown with a central depressed portion 14 about which the uper end of the standard 11 seats. The depressed portion 14 has a further function of countersinking the head 15 of a bolt 16 provided with a wing nut 17 housed in the base, and adapted to firmly secure the parts together.

The receptacle is shown as formed with side members 18 shown as cut away at 19 to permit inspection of the contents of the receptacle. The sides 18 may be desirably formed integral with the bottom 20 of the receptacle and members 21, 22 are shown as formed integral with the sides 18 and a lower end member 23 may also be formed integral with the ends of the bottom member 20. By folding the parts 21, 22, 23 into the position shown in Fig. 3, the ends of the receptacle are provided leaving a space 24 therebetween for further inspection of the contents of the receptacle.

Figure 2:
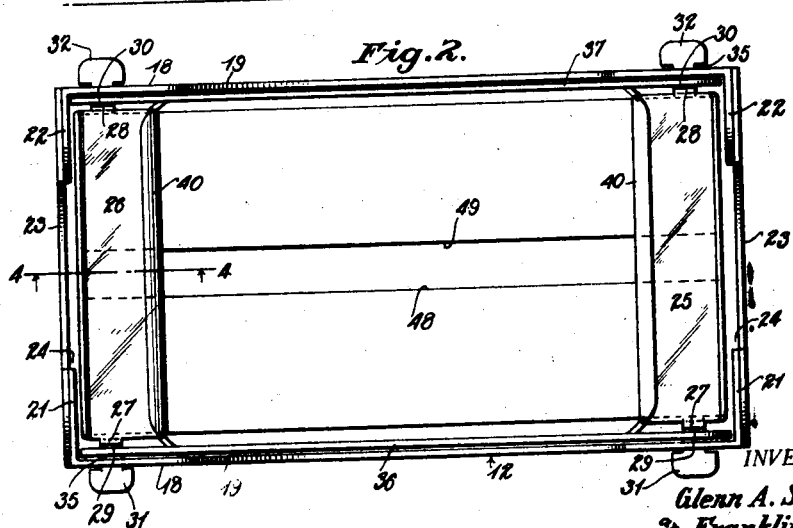
Fig. 2 is a plan view.

To serve as weights upon the ends of the sheets, as napkins which the device is designed to dispense, there are shown bars 25, 26, adapted to lie upon the ends of the stack of sheets. For the purposes of invention, the ends of bars 25, 26, are shown as turned downwardly at 27, 28, and then outwardly as at 29, 30, the outwardly turned ends 31, 32, projecting through slots 33, 34, in opposite sides 18 of the receptacle. As shown in Fig. 2, the portions of the ends of the bars which pass through the slots are reduced in width as indicated at 35, the outer portions of the ends being again enlarged as shown in the said figure.

To prevent access to the edges of the sheets whereby to grasp a plurality thereof, there are shown longitudinally arranged bars 36, 37, formed with slots 38, 39, through which the reduced portions 35 of the bars extend, the bars 36, 37 being arranged vertically and standing opposite the upper edges of the sheets in the dispenser for the purpose described.

The bars 25, 26 are shown with upturned edges 40 to provide a rounded edge from beneath which the ends of the sheets are withdrawn and also to enable a nail of the attendant to be inserted thereunder if it be desired to lift the bars from the interior of the receptacle.

The bars 36, 37 are shown as formed with upwardly arched upper edges 41 to follow the contour of the upper surface of the sheets which will be bulged upwardly by the greater compression of the ends of the sheets under the weight of bars 25, 26, and 36, 37.

To fill the receptacle when the supply of sheets therein approaches exhaustion, a new supply is merely laid within the receptacle upon the sheets, when the attendant by grasping the ends 31, 32, may twist the bars 25, 26 into the position shown in Fig. 5 and placing the hand upon the upper portion of the sheets may forcibly lift the bars up past the sheets and then may rotate the bars to their position of Figures 1 to 4 inclusive to cause the bars to overlap the ends of the upper sheet.

From an inspection of Fig. 5, it will be seen that when the bars 25, 26, are rotated to a position to pass the ends of the replenished sheets, the edge 40 may be engaged by the finger of the attendant through the spaces 24 at the end of the receptacle for convenience in lifting the bars past the stack of sheets.

A modified form of base is shown in Figs. 6 and 7 wherein a ring of rubber 42 is shown placed inside the flange 43 of the base and a clamping ring 44 having its ends turned inwardly as at 45, 46, and fitting snugly within the rubber ring, is sprung to the position shown whereby to hold the ring 42 in position. Since the ring 42 projects below the flange 43, the weight of the device will be carried upon the edge of the rubber and therefore avoid scratching of furniture upon which the device may be supported.

To support the device if it be desired to remove the base 10 and standard 11, there are shown buttons 47 projecting downwardly to a slightly greater extent than the center depression 14 and the bolt 16 may therefore be removed and the device may be used while seated directly upon a support.

The napkins which the device is particularly designed to dispense are such as are folded with inwardly projecting edges 48, 49, by which the uppermost napkin may be grasped and withdrawn, the ends slipping from beneath the bars 25, 26.

If it be desired to support the bars 25, 26 out of contact with the napkins while filling the dispenser, the portions 40 may be hooked over the upper edges of the end portions 21, 22 as clearly shown in Fig. 8, thus leaving the receptacle substantially unobstructed by the sliding apparatus.

Minor changes may be made in the physical embodiment of the invention within the scope of the appended claims without departing from its spirit.

We claim:

1. A napkin dispensing device comprising, in combination, a receptacle, guideways carried by the walls of said receptacle, weights adapted to rest upon the contents of the receptacle, said weights having portions extending at an angle to the body thereof and engaging said guideways whereby to allow said weights to be rotated to a position to pass the ends of articles in the receptacle.

2. A napkin dispensing device comprising, in combination, a receptacle having vertical slots in its side walls adjacent the ends thereof, a bar having offset end portions projecting through said slots and rotatable therein whereby to move the bar to a position to pass the ends of sheets in the receptacle said bars normally overlying said ends.

3. A napkin dispensing device comprising, in combination, a receptacle having vertical slots adjacent the ends of its side walls, bars normally resting upon sheets in the receptacle, said bars having depending end portions, each of said end portions having an outturned portion extended through said slots whereby said end portions may be grasped to rotate the bars to a position to pass the ends of the sheets overlying the same.

4. A napkin dispensing device comprising, in combination, a receptacle having vertical slots adjacent the end of its side walls, bars adapted to rest upon sheets in the receptacle, having normally depending end portions, said end portions each having an outturned portion extended through one of said slots whereby said end portions may be grasped to rotate the bars to a position to pass the ends of the sheets overlying the same, side bars lying in planes vertical to the edge of the sheets in the receptacle and having slots engaging said reduced portions.

5. A napkin dispensing device comprising, in combination, a receptacle having guide ways carried by walls thereof, a weight comprising a flat bar normally overlying sheets in said receptacle the ends of said bar reduced in size and slidably and rotatably engaging said guideways, an edge of said bar turned upwardly and inwardly to provide a hook portion engageable with a wall of the receptacle, upon rotation of the bar, to hold the bar in elevated position during placing of sheets in the receptacle.

6. A napkin dispensing device comprising, in combination, a receptacle having vertical guide slots adjacent the ends of the side walls thereof, weights comprising flat bars adapted to overlie sheets in said receptacle, the ends of said weights bent downwardly parallel to the sides of the receptacle and the terminals thereof bent into planes offset from the plane of the weight and slidably and rotatably engaging said slots, an edge of each weight bent upwardly and inwardly to provide a hook portion adapted to be rotated to engage the upper edge of an end wall of the receptacle whereby to support the weights during filling of the receptacle.

GLENN A. SHAFFER.
FRANKLIN H. WIRTZ.